US008419204B2

(12) United States Patent
Hermann, II

(10) Patent No.: US 8,419,204 B2
(45) Date of Patent: Apr. 16, 2013

(54) SPORTS RING RECEIVER AND TRANSMITTING UNIT

(76) Inventor: Grover M. Hermann, II, Columbus, OH (US)

( * ) Notice: Subject to any disclaimer, the term of this patent is extended or adjusted under 35 U.S.C. 154(b) by 0 days.

(21) Appl. No.: 13/044,599

(22) Filed: Mar. 10, 2011

(65) Prior Publication Data

US 2012/0176774 A1 Jul. 12, 2012

Related U.S. Application Data

(63) Continuation-in-part of application No. 29/382,944, filed on Jan. 10, 2011, now Pat. No. Des. 659,198.

(51) Int. Cl.
*F21V 21/08* (2006.01)
*G06F 3/033* (2006.01)

(52) U.S. Cl.
USPC .......... 362/104; 362/109; 362/186; 362/570; 362/571; 345/179

(58) Field of Classification Search ................ 362/104, 362/109, 186, 570, 571; 345/179
See application file for complete search history.

(56) References Cited

U.S. PATENT DOCUMENTS

| | | | | |
|---|---|---|---|---|
| 4,797,102 | A * | 1/1989 | Forsyth | 434/147 |
| 5,653,524 | A * | 8/1997 | Gray | 362/104 |
| 6,050,695 | A * | 4/2000 | Fromm | 362/104 |
| 6,928,834 | B2 * | 8/2005 | Robertson et al. | 63/27 |
| 7,165,859 | B1 * | 1/2007 | Munari | 362/103 |
| 7,461,944 | B2 * | 12/2008 | Alessio | 362/184 |
| 2011/0007035 | A1 * | 1/2011 | Shai | 345/179 |

* cited by examiner

*Primary Examiner* — Jong-Suk (James) Lee
*Assistant Examiner* — Mark Tsidulko
(74) *Attorney, Agent, or Firm* — Jason H. Foster; Kremblas & Foster

(57) ABSTRACT

A ring has a sphere on a band and is worn on the finger of a sports fan. An electrical circuit includes a power source and two LEDs. An antenna allows the ring circuit to receive signals sent wirelessly. A three position switch changes the settings of the circuit. When the switch is in a middle position, the ring is disconnected from its power source. When the switch is in one or the other of the other two positions, the wireless receiver components can receive signals from a transmitting unit. The ring is preferably worn by a sports fan at a sporting event, and upon switching the switch to the position associated with the team the fan supports, the ring can receive signals. Signals will be transmitted from the transmitting unit, and will cause the ring to flash the LED. Rings worn by fans flash in support of the fans' team.

8 Claims, 4 Drawing Sheets

SPORTS RING RECEIVER AND TRANSMITTING UNIT

CROSS-REFERENCES TO RELATED APPLICATIONS

This application is a continuation-in-part of U.S. Design patent application Ser. No. 29/382,944 filed Jan. 10, 2011. The above prior application is hereby incorporated by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

This invention pertains to the field of electronic communication devices used by attendees of sports events.

It is known that people who attend live sports contests can merely observe the game or match and have no interaction with the athletes who might be competing a mere few feet or many hundreds of feet away. However, because a sports contest is typically observed mostly by people who enthusiastically respond to every triumph and mistake of both teams, the attendees of sports contests normally make efforts to interact with the contest by indicating their approval or disapproval of action on the field or court. Therefore, sports fanatics ("fans") cheer, clap their hands, wave signs and use other devices, such as compressed air horns, vuvuzelas and others, to show their approval or disapproval of the significant events on the field or court.

However, during a live and in-person sports event, there is no known means for unifying the fans who support each team and giving them "instant feedback" regarding the play in the field or court. Jerseys, hats and other paraphernalia have colors, names and symbols of the team supported, and this tends to unify the fans of one team and distinguish them from the fans of the other team. However, such paraphernalia is passive inasmuch as it does not change during the game or match depending on the results of the performance during the game or match.

Therefore, it would be desirable for fans of teams to have unifying devices or articles that would be affected by the play during the game or match.

BRIEF SUMMARY OF THE INVENTION

The invention includes a ring worn on the finger of a sports fan by extending a band around one or more fingers. A preferably spherical globe is mounted to the band, and includes an electrical circuit including a power source and at least one, but preferably two, visual flashing devices, such as light emitting diodes (LEDs). An antenna with radio frequency (RF) or other wireless receiver components is also part of the ring and allows the ring circuit to receive signals sent wirelessly within a particular range of frequencies.

A three position switch changes the settings of the circuit. When the switch is actuated in a middle of the three positions, the ring is disconnected from its power source and thus does not respond to any signals. When the switch is in one or the other of the other two positions, the wireless receiver components can receive signals from a transmitting unit controlled by an official, or any person or machine that has been given instructions of operation.

The ring is preferably worn by a sports fan at a sporting event, and upon switching the switch to the position associated with the team the fan supports, the ring can receive signals. Such signals will typically be transmitted within a short range (between a few feet and a few hundred feet, typically) from the transmitting unit, and will preferably cause the receiving unit to flash the flashing device a number of times or with a particular frequency within a predetermined time period. Thus, the rings worn by fans of one team will flash in support of the fans' team when the team does something good, and the rings worn by fans of the other team will flash in support of the fans' teams when that team does something good.

The invention addresses the functions needed to bring awareness to the offensive and/or defensive play on the field or court of play after the play occurs. The rings can be worn by the sports fans to provide an instant feedback device that ideally highlights a thrilling offensive and/or defensive play on the field or court after the occurrence of the play on said field or court for either the away or home team. This unifies the fans of each team with one another, and also provides immediate information about how each fan's team is doing on the field or court. This intensifies the experience of the fans and gives a greater sense of unity to fans and intimacy with play.

Figure 1:
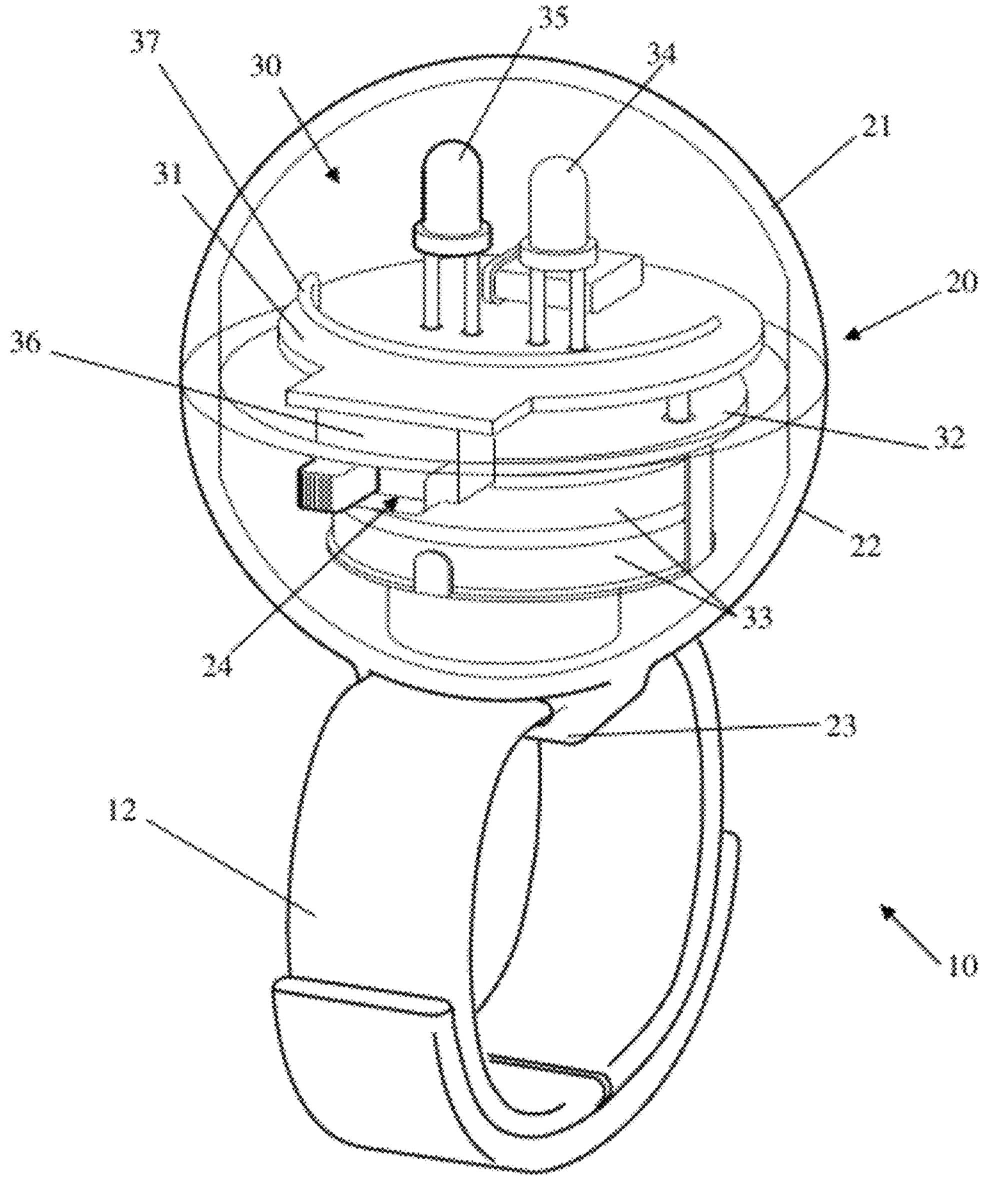
FIG. 1 is a view in perspective illustrating the preferred ring of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

The preferred ring 10 of the present invention is shown in FIG. 1 having a band 12, a globe 20 and electronics 30 within the globe 20. The band 12 is preferably a flexible material, including, but not limited to fabric, leather, a metal band with interlocking links to permit relative movement, or another flexible material. One exemplary material for the band 12 is hooks and loops material such as that sold under the trademark VELCRO. In operation, such material allows for variability in the size of the wearer's finger, and permits easy removability while still securing the ring well on the finger. Of course, the band 12 could be made large enough to be worn on the wearer's wrist, ankle, neck or any other part of the wearer's body or apparel without affecting the operation of the remainder of the ring 10.

Figure 2:
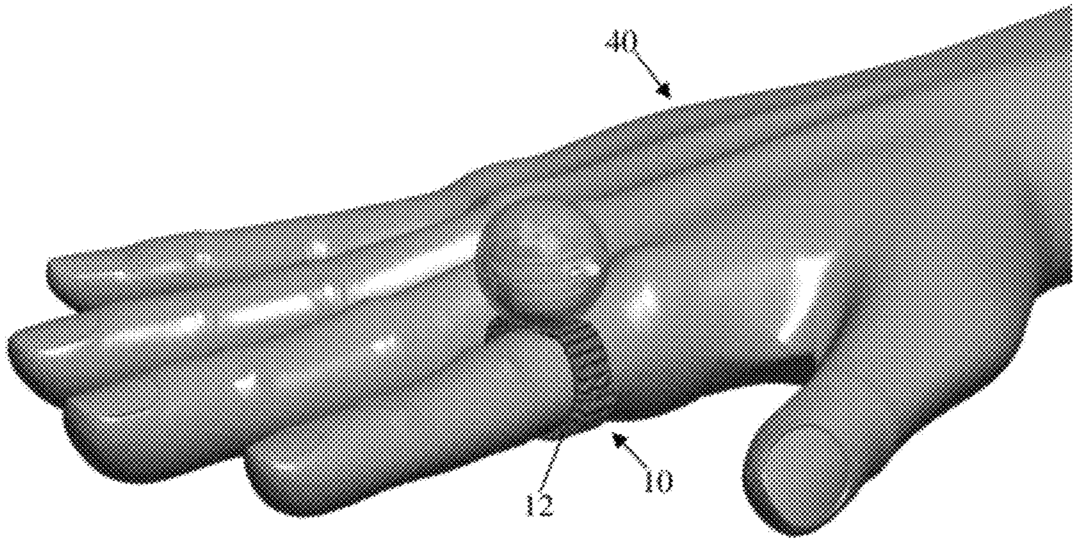
FIG. 2 is a view in perspective illustrating the ring of FIG. 1 in an operable position on the finger of a human wearer.

The globe 20 is preferably a translucent sphere made up of an upper hemisphere 21 and a lower hemisphere 22. The terms "upper" and "lower" refer to the relative positions of the hemispheres when the ring is in an operable position as shown in FIG. 2. The globe's translucent walls are preferably formed of a durable, clear material, including but not limited to glass, crystal, acrylic, polycarbonate or any other similar material.

The lower hemisphere 22 forms a "base" of the globe and has a slot formed in a loop 23 through which the band 12 extends. The upper hemisphere 21 mounts removably to the lower hemisphere 22 by fasteners, such as interlocking threads, a bayonet structure, grooves and matingly engaging protrusion, to thereby permit the upper hemisphere 21 to fasten firmly to the lower hemisphere 22, but also be removed therefrom for reasons that will become apparent from the description below.

The electronics 30 are mounted in the globe 20 and are preferably completely enclosed therein. Thus, any objects dropped on the ring 10, such as by the wearer or those around him or her, will not cause damage to the electronics 30. In a preferred embodiment, the globe 20 is water-resistant to prevent any liquids spilled on the ring from damaging the electronics 30.

A circuit board 31 is mounted to a frame 32, which is mechanically attached to the inwardly facing, concave surface of the lower hemisphere 22. The frame 32 extends toward the band 12 to hold a pair of button cell batteries 33, which serve as a power source for the circuit board 31, and are in electrical contact therewith. A first lighting device, such as the first LED 34 and a second lighting device, such as the second LED 35, extend from electrical connection to the circuit board 31 and preferably are actuated to light up, flash and turn off by the circuit board 31. It is preferred that the first LED 34 and the second LED 35 are of different colors or other characteristics in order that when one is lighted a person can visually distinguish it from the other when the other is lighted. In one embodiment, the first LED 34 is clear or white, and the second LED 35 is red.

A switch 36 is connected to the circuit board 31 and has a finger actuatable tip that protrudes through a slot 24 formed through the lower hemisphere 22. The function of the switch 36 is described in more detail below. An antenna 37 is also attached to the circuit board 31. The antenna 37 allows the circuit board 31 to receive an electromagnetic wave signal, preferably at a conventional radio frequency, from the transmitting unit as described below.

The ring 10 is shown being worn on the finger of a person 40. The band 12 extends around the person's finger and snugly engages the finger in a manner that is not uncomfortable to the person 40, but which also prevents unintentional removal of the ring 10 from the finger, such as by swinging the hand, clapping or any other common movement of a person.

Figure 3:
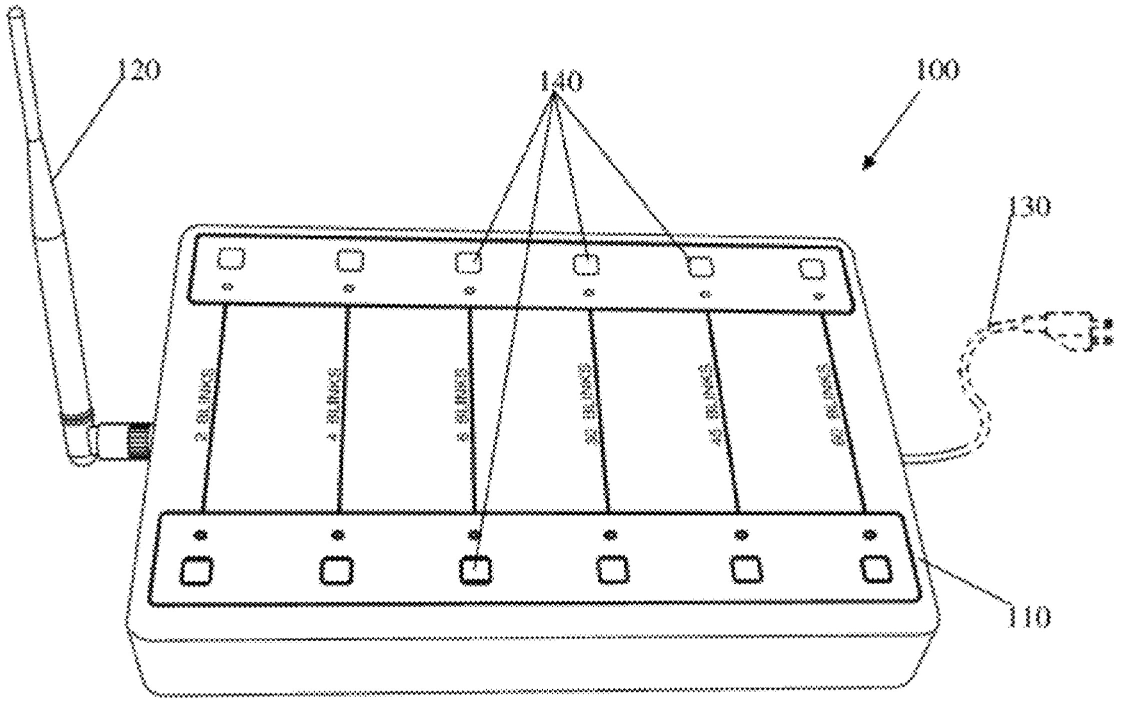
FIG. 3 is a view in perspective illustrating the preferred transmitting unit of the present invention.

The transmitting unit 100 is shown in FIG. 3 having a housing 110, an antenna 120, an electrical cord 130 and a plurality of switches 140. The housing 110 is preferably a metal, plastic or other hard material case with a chamber within (not illustrated) in which a plurality of electronic components are housed, as described below. The electronic components are contemplated to be a small computer, such as a logic circuit or programmable computer.

The antenna 120 mounts to the exterior of the housing 110 and extends to electrical connection with the interior electronic components therein. Thus, the antenna provides the electronic components with the capability to send and/or receive electromagnetic waves, preferably radio frequency signals.

The electrical cord 130 is the preferred power source providing electrical power to the electronic components within the housing 110. The electrical cord 130 could be replaced by another power source, such as batteries, a fuel cell, a photovoltaic cell or any equivalent source of electrical power.

The switches 140 are conventional electrical switches, preferably the "push button" type, and are electrically connected to the electrical components within the housing 110. Upon depression of a switch, a circuit is opened or closed, and upon release of the same switch the same circuit is closed or opened (the opposite of the action of depression). Each of the switches 140 opens or closes a different circuit, and thereby causes a different input to the electrical components within the housing 110.

In a preferred embodiment of the invention, each switch in the series of switches aligned on one side of the indicia corresponds with instructions to the electrical components to send a wireless signal to the ring 10 to cause the first LED 34 to flash a predetermined number of times. This only occurs if the switch 36 is set to allow this instruction to be carried out by the ring's circuit board 31. A different switch 140 causes the first LED 34 to flash a different number of times (or for a different period of time). Thus, a first switch can cause the first LED 34 to flash two times, a second switch can cause the first LED 34 to flash four times, and so on according to the desired programming of the transmitting unit and the rings.

In a preferred embodiment, the second LED 35 can be a red LED that represents one of the teams, such as the away team and the first LED 34 can be a white LED that represents the opposing team, such as the home team. Two of the positions of the switch correspond with the two LEDs. The three-way switch 36 is moved by the fan to one of three positions desired. Each position of the switch causes one, neither or the other of the LEDs to illuminate upon actuation of the transmitting unit by connecting the chosen LED to the power source, such as a battery. The wearer selects a switch position that corresponds to the LED for the team he or she wishes to support. Upon actuation of the ring by the transmitting unit, the color of LED that corresponds to the selected switch position blinks for a predetermined period of time, or for a predetermined number of blinks.

The fan has the choice of pushing the three way switch 36 to the left for the away team (red LED), in the middle to disconnect the batteries to save battery life or to the right for the home team (white LED) to activate the ring to receive a blinking duration signal from the transmitting unit. Upon actuation by the transmitting unit, the selected LED blinks for a period of time or for a predetermined number of blinks.

The ring enhances the sports fan's enjoyment and experience at the attended sports venue. The ring is preferably non-disposable with battery replacement thus causing the ring to give value to the customer and by promoting responsible care for the environment.

Figure 4:
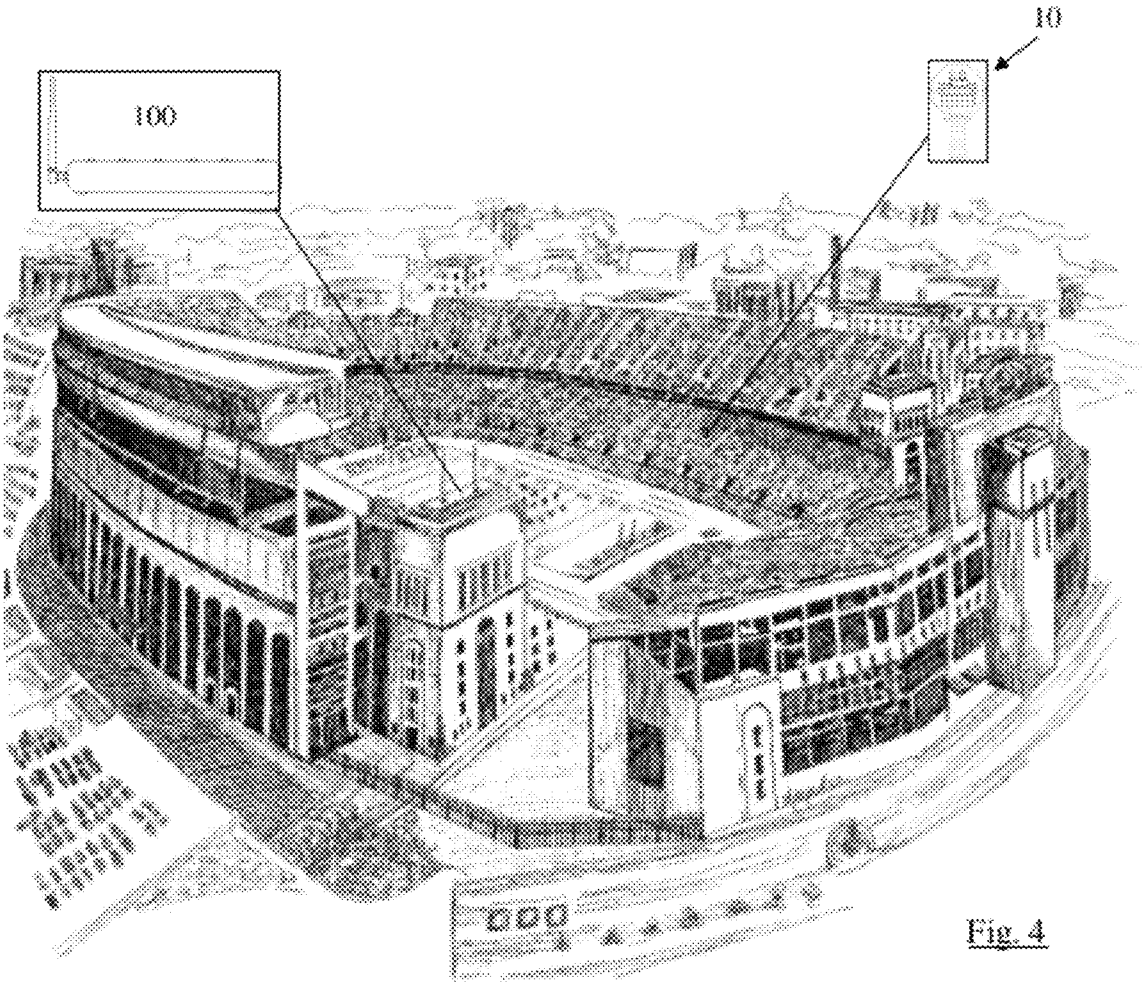
FIG. 4 is a schematic view illustrating contemplated positions for the transmitting unit and the ring during use.

It should be noted that all rings for a given sport preferably receive wireless signals from a transmitting unit within a particular radius. Thus, all fans at a baseball game, basketball game or other event receive signals from the transmitting unit wirelessly sending one or more signals to all of the rings in the facility where the sports contest takes place. This occurs upon depression of a switch by the operator of the transmitting unit. For example, FIG. 4 illustrates a stadium in which the transmitting unit 100 is positioned in a press room and the ring 10 is mounted on a wearer's finger across the stadium. Upon a signal being sent by the transmitting unit 100, the ring 10 will be signaled and will blink.

Thus, if the offense and/or defense of a baseball team makes a play meeting certain criteria (e.g., a home run), the transmitting unit sends a signal wirelessly to all rings that are like the ring 10 within a predetermine radius, and the rings with three-way switches set to receive the signal respond accordingly. Offensive and/or defensive play on the field (or court) of play controls or relates to the number of blinks by the red or white LED based on whether the fan is cheering for the away team (preferably the red LED) or the home team (preferably the white LED) sent by a signal from the transmitting unit. Of course, the actuation of the transmitting unit for a positive offensive or defensive play by one team could also signal the rings set to support the other team to blink in a competitive manner, such as with stroboscopic frequency, in order to support the opposing team.

In a baseball game, the LED selected by ring wearer is preferably actuated by the transmitting unit to blink for a period of time corresponding to different acts by the offense, such as:

(1) 5 blinks—for a single base hit/walk/balk/steal
(2) 10 blinks—double base hit/double steal
(3) 15 blinks—triple base hit
(4) 30 blinks—home run
(5) 45 blinks—grand slam home run
(6) 60 blinks—winning team.

In a baseball game, the LED selected by ring wearer is preferably actuated by the transmitting unit to blink for a period of time corresponding to different acts by the defense, such as:

(1) 5 blinks—one out
(2) 10 blinks—two outs
(3) 15 blinks—three outs.

Alternatively, a base hit could cause the unit to blink two times, and four times for a double, and so on. In every case, the offensive and/or defensive play on the court of play or field relates to the number of blinks by the red LED or white LED based on whether the fan is cheering for the away team or the home team sent by a signal from the transmitting unit.

In a basketball game, the LEDs can blink for a period of time for a particular desirable accomplishment by the offense as follows:

(1) 2 blinks—1 point (free throw line)
(2) 4 blinks—2 points (inside the ½ circle)
(3) 6 blinks—3 points (outside the ½ circle)
(4) 30 blinks—signals end of period #1 & period #3
(5) 45 blinks—signals end of period #2 (or) half-time
(6) 60 blinks—winning team In a basketball game, the LEDs can blink for a period of time for a particular desirable accomplishment by the defense as follows:

(1) 2 blinks—stolen ball
(2) 4 blinks—blocked shot

Regardless of the sport being attended, the general concept includes at least one fan, and preferably all fans, wearing a ring, and moving the switch to the position corresponding to the team he or she supports. Upon some action occurring in the match or game, the transmitting unit is actuated by depressing a switch, whereupon a corresponding signal is sent to all rings. All rings that correspond to the team for which the switch is depressed have LED's that blink a predetermined number of times or for a predetermined time period. This cycle can be repeated numerous times during the game or match. After completing the game or match, the switch on all rings is positioned to cause little to no drain on the batteries until the next contest the wearer attends.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An apparatus for sports fans, the apparatus comprising:

(a) a plurality of rings, each ring including a band for extending around a respective fan's finger and a globe mounted to the band, the globe including an electronic circuit, power source, antenna, at least first and second lights, and a switch having at least a first position and a second position, the first of said positions corresponding to the first light and the second of said positions corresponding to the second light; and (b) a transmitting unit spaced from the rings a distance that permits wireless communication between the transmitting unit and the rings, the transmitting unit having an antenna, a power source, a housing and a plurality of depressible switches, at least some of said depressible switches corresponding to the first light on the rings, and at least the other of said depressible switches corresponding to the second lights on the rings, whereby actuation of one of said depressible switches corresponding to the first lights causes a wireless transmission of instructions from the transmitting unit to all rings whose respective switches are in the first position, thereby causing the first lights on said rings whose respective switches are in the first position to turn on and then turn off, and whereby actuation of one of said depressible switches corresponding to the second lights causes a wireless transmission of instructions from the transmitting unit to all rings whose respective switches are in the second position, thereby causing the second lights on said rings whose respective switches are in the second position to turn on and then off.

2. The apparatus in accordance with claim 1, wherein the first and second lights of each ring are light emitting diodes (LEDs).

3. The apparatus in accordance with claim 2, wherein the switch of each ring has three positions, the first of which corresponds to the first LED, the second of which corresponds to the second LED and the third of which corresponds to disconnection of the power source from both LEDs of the corresponding ring.

4. The apparatus in accordance with claim 3, wherein the globe is a transparent sphere that can be opened and closed.

5. A method comprising:

(a) disposing a band of a first ring around a human finger of a first person, the first ring having a globe mounted to the band, the globe including an electronic circuit, power source, antenna, at least first and second lights, and a switch having at least a first and a second position, the first of said positions corresponding to the first light and the second of said positions corresponding to the second light;

(b) the first person moving the switch to the first position, thereby allowing the first light to be lighted;

(c) disposing a band of a second ring around a human finger of a second person, the second ring having a globe mounted to the band, the globe including an electronic circuit, power source, antenna, at least first and second lights, and a switch having at least a first and a second position, the first of said positions corresponding to the first light and the second of said positions corresponding to the second light;

(d) the second person moving the switch of the second ring to the second position, thereby allowing the second light of the second ring to be lighted; and (e) disposing a transmitting unit in a position spaced from the first ring and the second ring, the transmitting unit having an antenna, a power source, a housing and a plurality of depressible switches, at least one of said depressible switches corresponding to the first light on the first and second rings, and at least another of said depressible switches corresponding to the second light on the first and second rings;

(f) a third person depressing said at least one of said depressible switches corresponding to the first lights, thereby causing the transmitting unit to send a signal wirelessly to the first ring, which thereby causes the first light on the first ring to light and then cease lighting; and (g) the third person depressing said at least another of said depressible switches corresponding to the second lights, thereby causing the transmitting unit to send a signal wirelessly to the second ring, which thereby causes the second light on the second ring to light and then cease lighting.

6. The method in accordance with claim 5, wherein the third person depresses switches in response to actions of athletes in a sporting event.

7. An apparatus for sports fans, the apparatus comprising:

(a) a plurality of rings, each ring including a band for extending around a respective fan's finger and a globe mounted to the band, the globe including an electronic circuit, power source, antenna, at least one light with first and second characteristics, and a switch having at least a first position and a second position, the first of said positions corresponding to the first characteristic and the second of said positions corresponding to the second characteristic; and (b) a transmitting unit spaced from the rings a distance that permits wireless communication between the transmitting unit and the rings, the transmitting unit having an antenna, a power source, a housing and a plurality of depressible switches, at least some of said depressible switches corresponding to the first light characteristic on the rings, and at least the other of said depressible switches corresponding to the second light characteristic on the rings, whereby actuation of one of said depressible switches corresponding to the first characteristic causes a wireless transmission of instructions from the transmitting unit to all rings whose respective switches are in the first position, thereby causing illumination of the light with the first characteristic on said rings whose respective switches are in the first position, and whereby actuation of one of said depressible switches corresponding to the second characteristic causes a wireless transmission of instructions from the transmitting unit to all rings whose respective switches are in the second position, thereby causing illumination of the lights with the second characteristic on said rings whose respective switches are in the second position.

8. The apparatus in accordance with claim 7, wherein the first characteristic is a first color and the second characteristic is a second, different color.

* * * * *